(12) United States Patent
Ozorhan et al.

(10) Patent No.: US 11,514,082 B1
(45) Date of Patent: Nov. 29, 2022

(54) DYNAMIC CONTENT SELECTION

(71) Applicant: Amazon Technologies, Inc., Reno, NV (US)

(72) Inventors: Onur Mustafa Ozorhan, Madrid (ES); Vicu Straticiuc, Madrid (ES); Jose Maria Palacio Lardin, Madrid (ES)

(73) Assignee: Amazon Technologies, Inc., Seattle, WA (US)

( * ) Notice: Subject to any disclaimer, the term of this patent is extended or adjusted under 35 U.S.C. 154(b) by 807 days.

(21) Appl. No.: 16/124,817

(22) Filed: Sep. 7, 2018

(51) Int. Cl.
  *G06V 10/00* (2022.01)
  *G06F 16/28* (2019.01)
  *G06F 16/435* (2019.01)
  *G06F 16/583* (2019.01)
  *G06V 10/40* (2022.01)

(52) U.S. Cl.
  CPC .......... *G06F 16/285* (2019.01); *G06F 16/435* (2019.01); *G06F 16/583* (2019.01); *G06V 10/40* (2022.01)

(58) Field of Classification Search
  None
  See application file for complete search history.

(56) References Cited

U.S. PATENT DOCUMENTS

| | | | |
|---|---|---|---|
| 7,856,380 B1* | 12/2010 | Latin-Stoermer | G06Q 30/0633 705/27.1 |
| 10,296,540 B1* | 5/2019 | Bhole | G06F 16/51 |
| 2014/0201126 A1* | 7/2014 | Zadeh | A61B 5/165 706/52 |
| 2014/0280952 A1* | 9/2014 | Shear | H04L 63/10 709/226 |
| 2019/0354609 A1* | 11/2019 | Huang | G06F 16/248 |

* cited by examiner

*Primary Examiner* — Tuankhanh D Phan
(74) *Attorney, Agent, or Firm* — Hogan Lovells US LLP (57) ABSTRACT

Elements to be provided for display with an instance of content can be determined dynamically based upon features of those elements. The actions or behavior of a user can be stored over time, and used to determine element features that are of interest to the user for various categories of content. In order to obtain enough data for multiple categories, clustering of users can be performed where users with similar behaviors are grouped together, and their preferences for features determined for various categories. When a request for content is received, a category and user identity can be determined for the request, which is used to determine the appropriate cluster. The feature preferences for that cluster can then be used to select elements (e.g., images, audio, or video) to present with the content based at least in part upon the relevant features of those elements.

20 Claims, 7 Drawing Sheets

DYNAMIC CONTENT SELECTION

BACKGROUND

As computing technology continues to advance and an increasing amount of data is stored electronically, there is a corresponding need to improve the ways in which data is provided or consumed. For instance, there may be various types of images available for display for an instance of content, but it might be possible to only display or feature one of those types of images based on space limitations or other such constraints. As such, a content provider will typically pick a default image to display for the instance, but this does not take into account the preferences of different users, and thus may prevent the users from accessing the instance relative to other instances of content that more closely match those preferences.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the determination of information to provide in response to a request for content. In particular, various approaches determine images and other elements that are associated with the content, and use features of those images or elements to determine which to provide. Data for actions or behavior of a user can be stored over time, and used to determine element features that are of interest to the user for various categories of content. In order to obtain enough data for multiple categories, clustering of users can be performed where users with similar behaviors are grouped together, and their preferences for features determined for various categories. When a request for content is received, a category and user identity can be determined for the request, which can be used with other relevant information to determine the appropriate cluster. The feature preferences for that cluster can then be used to select elements to present with the content based at least in part upon the relevant features of those elements. Such an approach can enable different images or elements to be provided to different users for the same content, where the different images or elements may be more likely to cause the user to take an action, such as to obtain more information about the content or purchase an item represented by the content, among other such options.

Various other functions can be implemented within the various embodiments as well as discussed and suggested elsewhere herein.

Figure 1A:
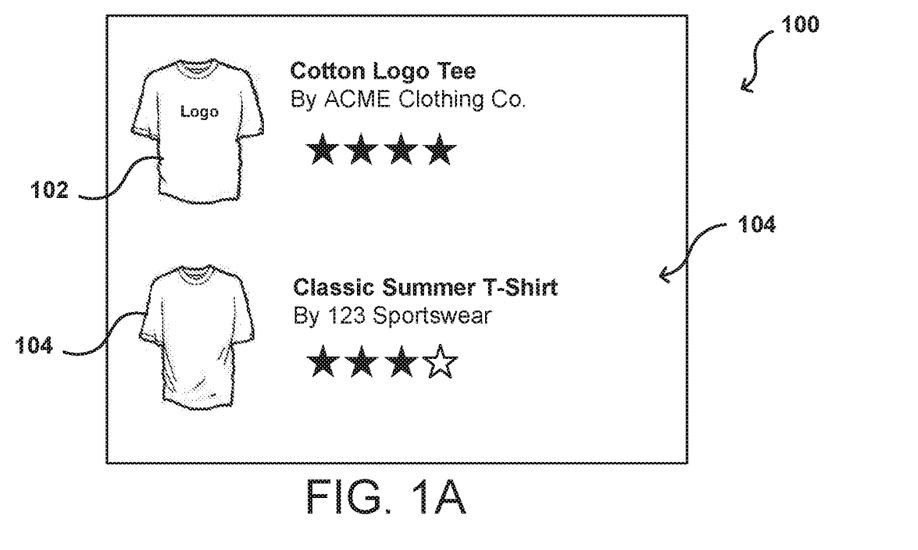
FIGS. 1A, 1B, 1C, 1D, and 1E illustrate example images that can be provided for display for an instance of content that can be utilized in accordance with various embodiments.

In various embodiments, a content provider may have multiple ways in which content can be surfaced. For example, if a user is searching or browsing for content, the provider can display or present a set of images, text, videos, audio, or other media or information that is representative of the content. FIG. 1A illustrates an example display 100 that can be presented in response to a request to search or browse certain types of apparel items. In this example, there are at least two instance of content, each corresponding to a respective t-shirt that may be available for purchase. In addition to descriptive text 104 for each item, there is a respective image 102, 104 displayed that is representative of the item. In this embodiment, this may correspond to a thumbnail image, or a smaller version of an image that may be displayed, including a representation of the respective item. In this example, each image displayed is an image of the shirt itself, positioned in front of a solid color background.

Figure 1B:
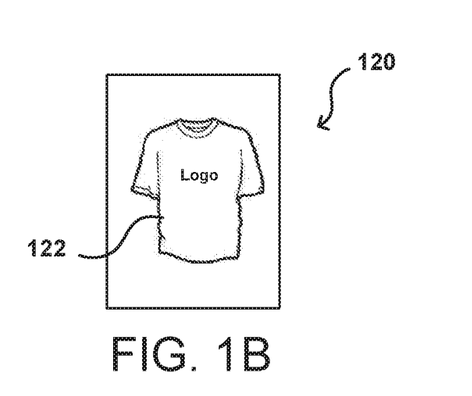
Figure 1C:
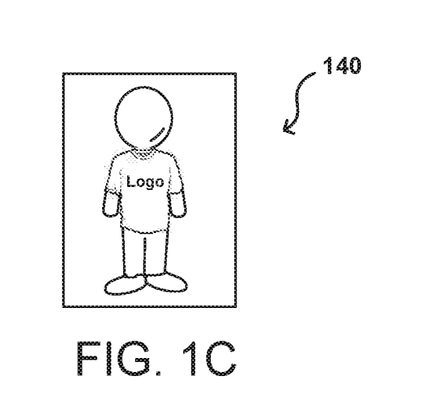
Figure 1D:
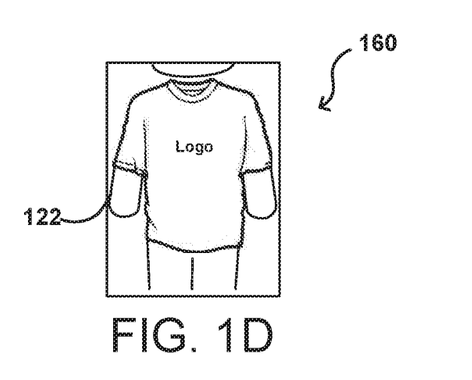
Figure 1E:
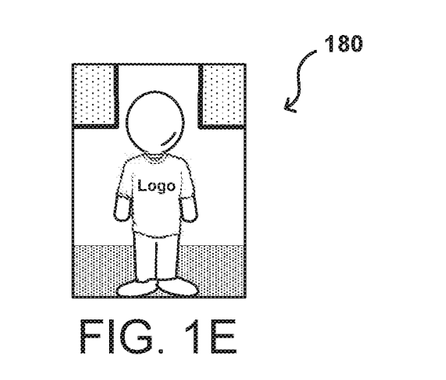

While such images may be representative of the respective items, such display may not be optimal for all users. For example, some users might be more interested in, or at least might be more likely to view, content with images that show a person wearing the item of apparel. Some users might want to see the item in a real world setting, while other users might find background objects distracting and prefer to see only a representation of the item or object of interest. For example, FIG. 1B illustrates an example image 120 wherein a view of the shirt 122 is shown against a plain background, with no other objects in the image. While this is clear as to the shirt, and thus may be desirable to some users, it does not provide any indication of how the shirt might look on a person, how it might hang or fit, etc. For some users, an image 140 such as that illustrated in FIG. 1C might be preferable, where the view includes a representation of a person wearing the shirt. This provides a better impression of how the shirt might look if worn by a person of a certain size or shape. Of course, some people may be less likely to be interested in the image if the person has a shape or look different from the user. Thus, for those users an image might be preferable such as the image 160 illustrated in FIG. 1D, where the shirt 122 is shown as worn by a person, but much of the view of the person is not included. In still other situations, a user might want to see how the item looks in a real world setting, such as in the image 180 of FIG. 1E, wherein a person is shown wearing the shirt in a location, which may be appropriate for the type of item in at least some embodiments. For example, a jacket might be shown in a snowy environment while a swimsuit might be shown in front of a pool or along a beach.

Approaches in accordance with various embodiments can attempt to determine an optimal image, or other type of media or information, to present to a user, where the selection can be made dynamically based on what is known about the user and what is known about the available media or information. Such an approach can involve components for determining interests or preferences of various users, which may vary by category or type of content. In many instances, there may not be much available data for a specific user for a specific category of content. Such an approach can also involve determining features of the available media or information. For example, there might be images provided that show various views that may include different objects, but the specific relevant features of the images might not be identified or provided that would enable an adequate determination for users accessing the relevant content.

For purposes of explanation the present discussion will focus on images, but as mentioned elsewhere herein there can be other types of media, data, or information analyzed and selected dynamically as well within the scope of the various embodiments. For a given instance of content, such as information relating to a particular item, there can be various images received, generated, or obtained that show different views of that item. In many instances, there may be at least some information or metadata provided with the images, as may relate to the item represented in those images. The data will often not include information about various features or aspects of the image, such as where there are other objects in the image, whether the item is displayed against a blank background or in a real world environment, whether a person is at least partially represented in the image, etc. Accordingly, approaches in accordance with various embodiments can analyze at least some of these images to attempt to identify and/or extract features that can be useful in identifying, assigning, or classifying a type or category of image, which can be useful in determining which image to display for the item for a particular opportunity.

In one embodiment, a set of images will be received that is associated with an item or instance of content. As mentioned, the images may include different views of an item, from different angles, in different settings, under different lighting conditions, etc. The images can be processed to attempt to identify at least some of these features or aspects, which can be used in selecting images to surface to different types of users. In this example, a processing approach will first analyze any metadata or information associated with the image. As mentioned, this might include information about the name or brand of the item, a category of the item, a source of the item, or other such information. The information can also be processed using an image analysis approach, such as may involve a computer vision algorithm and/or machine learning-based approach, to attempt to identify one or more features or aspects contained in, or represented by, the image.

In one embodiment, each image is processed using a convolutional neural network that has been trained using a set of training images with different types of features annotated. The types of features can vary by embodiment, and can also be learned or expanded over time. An example set of features could include information about the item view, a type of background, presence of other objects or items, presence of people represented, amount of text included, brightness, contrast, color, and filter applied, among other such options. Each image can be processed or classified using such a network, and the resulting features or aspects associated with the image, such as through tags, metadata, or associated data records. The set of images, with the feature data, can then be stored for use in presenting content to various users or entities.

When content is to be surfaced, such as in response to a request associated with a user, information about that user can be utilized to determine which image(s) to provide for display. This can include determining, for a relevant category or type of content, which features are most likely to be of interest to the user, or most likely to cause the user to view a particular instance of content. As mentioned, this determination can be based upon past behavior or actions of the user with respect to content in that particular category. User actions taken with respect to prior displayed instances of content can be tracked, along with the features of the images that were displayed. If a user takes action, such as to access an instance of content, then features of the associated image that was displayed can be stored and associated with a positive preference of the user. If the user does not take an action, or takes an action with respect to a different instance of content, then features of the image for the unselected content instance can be stored and associated with a negative preference of the user. Given sufficient data points, a profile can be generated for the user than indicated the types of image features that are likely to be more appealing to the user, which can then be used to select images for display based at least in part upon the types of features represented by those images.

In many instances, however, there will not be enough data to provide an accurate determination for a given user. There may be categories or items or content where the user has not previously taken any action or attempted to access any content, as well as categories where there are only a few data points and not enough information to generate an accurate profile or preference for that user. In such cases, it may be beneficial to attempt to predict the preferences of the user in a given category based on the preferences of the user in other categories. For example, if a user always prefers images along against a clear background, then it might be safe to assume that the user will prefer that type of image for a current or new category as well. For new users with no data in any category, other information might be used to cluster the user where available and where users have consented to use of such information, as may include information about the location of the user, age, gender, type of device used for access, type of account, etc.

Many users will prefer different types of image features for different types or categories of content, however. For example, a person might like to see images of consumer products against a clear background, but prefer to see images of apparel being worn by a model. The same person might like to see artwork in an actual setting, such as a living room, to get a sense of scale and appropriate color palettes, etc. Thus, it can be preferable in at least some embodiments to attempt to generate a profile or prediction of the preferences of the person in a particular category based on the information that is available.

In at least some embodiments, this prediction approach can be based upon information obtained for other users of the system or service. For example, there might be various other users who have demonstrated similar behaviors or preferences for a variety of categories. If a sufficient number of users with similar preferences can be determined, then the preferences of those users in a specific category can be used to predict the preferences of a specific person having similar preferences. Such an approach can also benefit from the aggregation of data for the similar users in that specific category, where there may not be enough data points to draw inferences for any individual user, but the information for the similar users can be pooled or aggregated in order to determine preferences with at least a minimum level of confidence. These preferences can then be used to select images (or other media, content, or information) to be presented based at least in part upon the features of those images. In at least some embodiments there may be a default image for an item, or image type for a category of items, and if there is no set of preferences determined with at least the minimum confidence then the default image may be provided for display.

In at least some embodiments, data such as the historical action or preference data for a group of users can be used to cluster those users into a set of user clusters, where the users in a user cluster have been determined to have similar preferences, or at least to take similar actions in response to being exposed to images or other elements having similar aspects or features. Various clustering algorithms can be used to cluster the users based on such information. When a request is received for content in a specific category, a determination can be made as to the cluster in which a user associated with the request has been assigned. As mentioned, the clusters can be generated across categories, for individual categories, or even for specific sub-categories in at least some embodiments. In some embodiments the level of clustering can be determined by the clustering algorithm given minimum clustering criteria, etc. Once the cluster is identified, the features of interest for that cluster for a given category can be determined. In some embodiments the features or aspects may be ranked or weighted based on historical or preference data, etc., and then the rankings or weightings used to select one or more images, or other elements, to provide in response to the request. For example, a given cluster might have a strong preference for images against a solid background, without people or other objects represented in the image. The content might have a set of images with different features identified, and those features can be compared against the preferences for that cluster. A comparison process can analyze the features of the available images to generate a ranking of images based on the weightings or feature rankings, such as by using a matching function or other such algorithm. A highest ranked image, or set of highly ranked images, can then be selected in this example for surfacing to the user with the content. As mentioned, this may include a thumbnail image for an item with a link to obtaining additional information about the item.

Figure 2A:
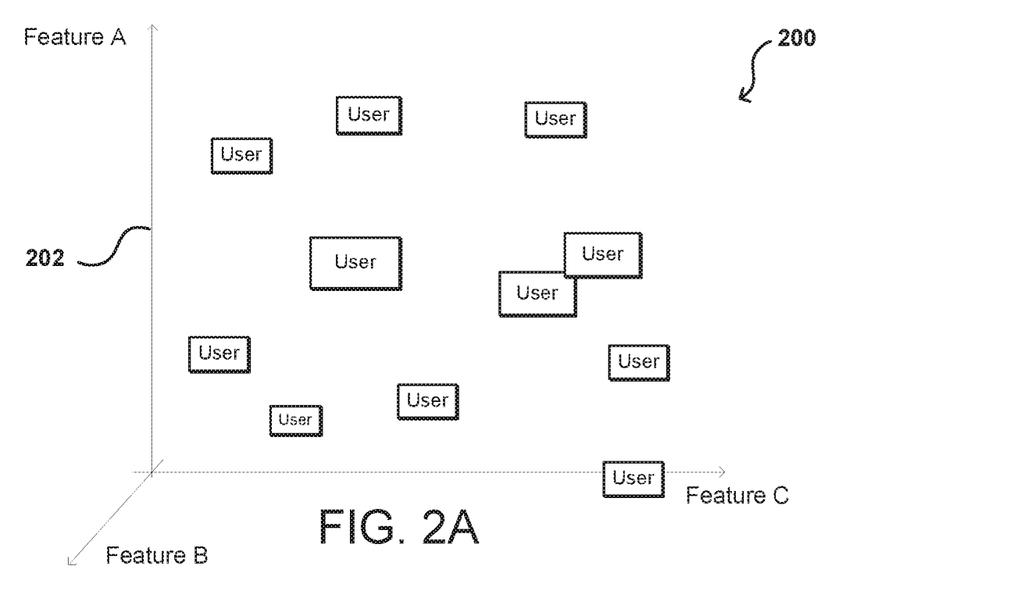
FIGS. 2A and 2B illustrate an example approach to clustering users in feature space that can be utilized in accordance with various embodiments.
Figure 2B:
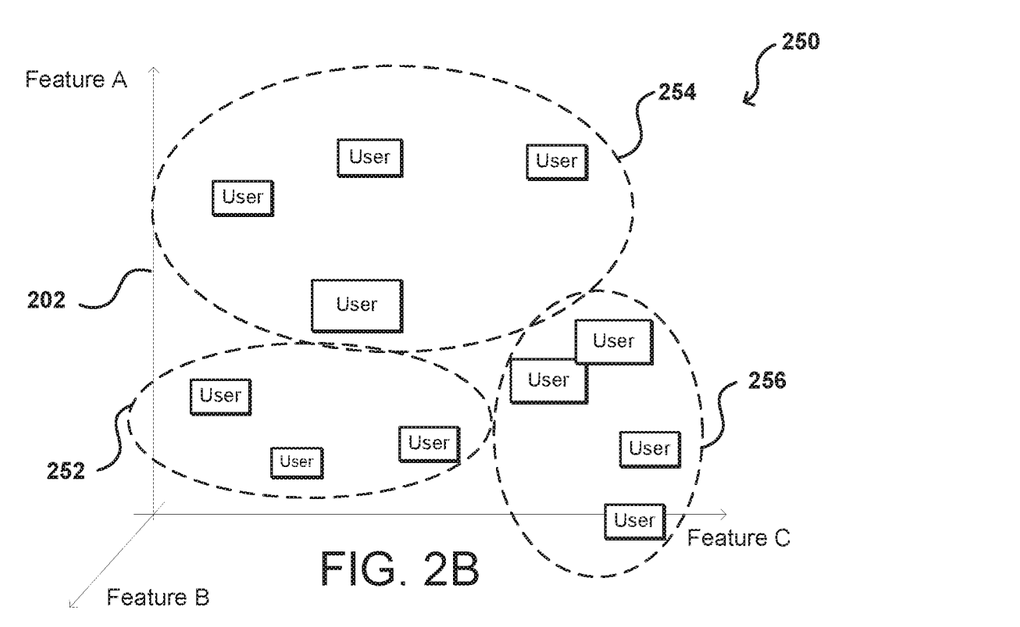

FIGS. 2A and 2B illustrate an example approach to clustering that can be utilized in accordance with various embodiments. In the example plot 200 of FIG. 2A, each of a set of users is plotted as a point in feature space. It should be noted that these could be different users or the same users in different contexts, such as for a work versus home context, vacation vs. non-vacation context, and the like. The feature space can have any number of dimensions, as may correspond to the number of features being tracked, but here is shown in three dimensions for purposes of illustration. As discussed, such a plot or analysis can be performed across all categories or for individual categories or types of content, among other such options. In this example, each user is plotted as a point in n-dimensional feature space 202, where the value along each axis can be a binary value (i.e., "of interest" or "no interest") or as a weighting value, such as a determined importance of a given feature in the user having interest in an image, where the values might be normalized on a scale from, for example, 0 to 1. It should be understood that plots are provided to help with visualization and understanding of aspects of the various embodiments, and that such plotting need not actually be performed for various embodiments. The various feature values or vectors for the users, once obtained, can be analyzed using an appropriate clustering algorithm to attempt to allocate each user to a cluster of similar users. In the example plot 250 of FIG. 2B, the user data has been analyzed and the users clustered into one of three clusters 252, 254, 256, where each cluster includes users with substantially similar preferences for at least one relevant category or other such classification.

In one example action data for an instance of content may include a user selecting a link or option to obtain more information for an item, purchasing the item, viewing additional data about an item, or other such actions or behavior. In some embodiments each of these actions may be taken into account, in some cases with different values or weightings. In addition to determining which image features are associated with content where such actions were taken, as discussed in more detail elsewhere herein, the different types of actions may be used to cluster users as well in at least some embodiments, where certain features might cause a group of users to view information for an item, while other features may be more likely to cause, or be associated with, a user purchase of that item. Each cluster or bucket of users can then be mapped to a set of features that are determined to be relevant or of important for those users, or can be mapped to a specific ranking or weighting of features determined for those users. Images can then be selected, featured, or prioritized based on the features of those images relative to the mappings of the cluster.

As mentioned, in at least some embodiments the level of categories, or subcategories, for which to perform clustering can be determined dynamically, and can be modified over time. In one example approach, the cluster variance across different categories at different levels can be analyzed. If the variance at a given level is within a variance threshold, then categorization may be done at a higher level. The level determinations can vary by category as well, where the categorization level used for clustering for an apparel category might be significantly lower than the categorization level for an electronics category, for example. For a hierarchical categorization tree, some branches might perform clustering at, or near, a leaf node, while for other branches the categorization clustering may be near the root node, etc. Machine learning approaches can be used to determine clustering levels as well in at least some embodiments. Various clustering algorithms can be utilized, such as may include expectation-maximization clustering, k-means clustering, mean-shift clustering, agglomerative clustering, or other such algorithms. While re-clustering after individual actions may be impractical, periodic re-clustering may be used to improve performance, as well as to ensure that users are assigned to the appropriate clusters, particularly as a user's preferences or actions may change over time.

In some embodiments there may be factors that impact the clustering of the various individuals. For example, the location of a user may impact the cluster, as the user may have different preferences when at work than when at home. This can be true of the time of the request as well, such as whether the request is made during the day or at night. The type of device being used may have an impact as well, as a user may have different preferences when accessing content from a smart phone than from a desktop computer, smart television, smart speaker, or game console. The clusters in these examples may be precomputed, or determined periodically as discussed above, and the relevant cluster for a request determined based at least in part upon this additional contextual information.

Approaches to feature extraction may also be category-specific in at least some embodiments. There may be significant variance in the number of images provided for items in different categories, as a painting might only have a couple of front views while a dress might have views from multiple angles, in addition to views where the dress is or is not being worn by a model, etc. Similarly, an image of a chew toy might have images where the toy is being played with by a dog, shown by an animal, etc. Thus, the types of features applicable to a specific category might vary. These can be determined manually or learned over time. For example, a category of wall posters might have almost no images that include people, and no images of people wearing the posters, so the feature extraction algorithm can learn to not look for those features or aspects for items or content in that particular category. This can provide a benefit in reducing the amount of time and resources needed for the feature extraction, as a significant amount of computer vision processing may be needed to identify various objects in an image, and if those objects can be quickly classified as unimportant for a given category then at least a significant amount of that processing can be avoided. Features such as plain background, brightness, and color palette can be much less resource intensive to determine, such that it would be beneficial to focus on only the relevant features for a category once determined. In some embodiments, at least some of the images will undergo a full analysis in order to ensure that no important features are inadvertently excluded, as well as to ensure that any features that are no longer needed are analyzed.

In images where the item represented is known, such as may be based on the associated metadata, some pre-processing of the image can be performed to remove portions of the image associated with the item. For example, if the item is a bike then known images of the bike can be compared against the image being processed to determine a portion of the region corresponding to the bike, which can then be removed or excluded from consideration for feature analysis. Computer vision can then focus on the remaining portion(s) of the image, which can greatly simplify the search space in at least some embodiments.

Such approaches can be used for other media or types of information as well as discussed herein. Feature extraction can be performed on graphics, animation, video, virtual reality content, text, presentation widgets or modules, and the like, and then compared against the features for the relevant clusters. Audio and other type of information can be analyzed using similar processes as well, where the audio or other features are matched against the features of the relevant clusters. These can be compared with images and other types of media or information as well, such as where a determination can be made as to whether to display an image, video, or animation in a space for a given instance of content. Different types of feature extraction algorithms can be used based at least in part upon the type of content, file, or element being analyzed. These can include, for example, a textual metadata extractor, image feature extractor (that can be used on frames of video as well), audio signature extractor, and the like, as may include a principal component analysis (PCA), scale invariant feature transform (SIFT), or other such algorithm.

In some embodiments an image might be manipulated based on the features associated with a user cluster. For example, it might be determined that for a given category a cluster of users prefers to see items against a colored background, as well as images with bright colors. Accordingly, in some embodiments one or more images can be processed to change the color of the background or the appearance of the image in order to more closely match the desired features. This can be done dynamically in near-real time, or the images can be pre-processed based on the relevant features and stored for subsequent use with specific categories of content. In some embodiments images can be generated by placing objects against a selected background, adding people or objects to the image, etc. In some embodiments a cluster of users might like a specific image filter to be applied to content images, and such information can cause the filter to be applied to any or all relevant content for at least the respective category.

In addition to providing advantages to content providers and users, approaches in accordance with the various embodiments provide various technical advantages as well. For example, being able to provide customers with content of interest more quickly will reduce the amount of time and effort the user will need to make in navigating the content, which reduces network load, memory and processing capacity, and potential disk access in at least some embodiments. Such an approach can provide for a simplified user interface as well, which can improve the user experience as well as reducing the amount of processing and storage capacity needed to provide the interface for a large number of users. Such an approach can also benefit a system of an entity providing the content, such as a seller of an item or a producer of media content. By being able to accurately determine the features of importance to a user, the producer system can utilize less processor, memory, and transmission resources as elements can be generated that are of interest to users for the particular category, avoiding the transmission of less interesting elements or the additional testing of those elements. Further, the ability for a system to manipulate elements based on those feature preference can reduce the total variety of elements that need to be produced by a particular provider system.

Figure 3:
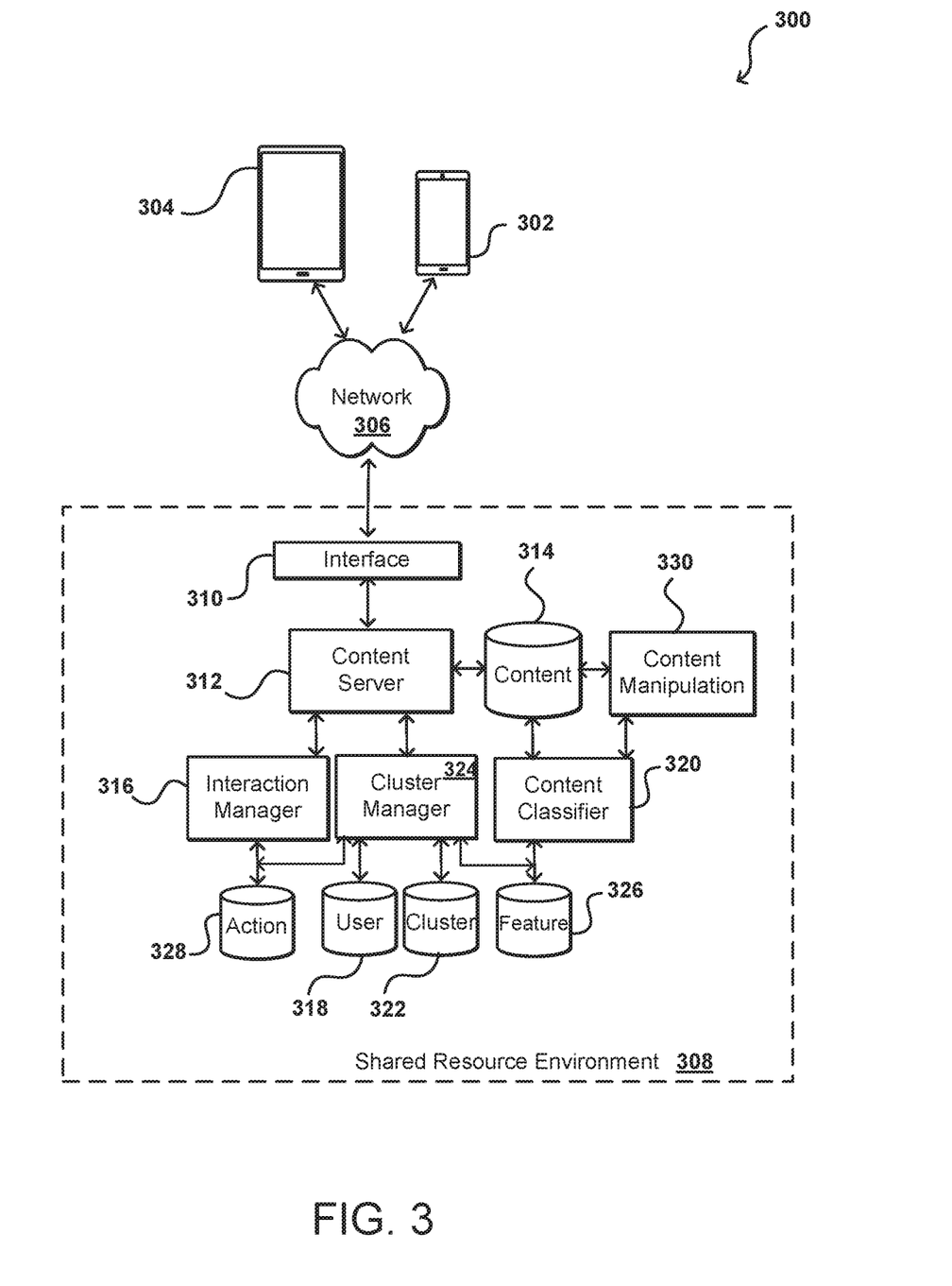
FIG. 3 illustrates an example system for determining content to provide for a user that can be utilized in accordance with various embodiments.

FIG. 3 illustrates an example system 300 that can be utilized to perform such processing in accordance with various embodiments. In this example users are able to utilize client devices 302, 304 submit requests for content. The client devices can include any appropriate electronic devices operable to send and receive requests, messages, or other such information over an appropriate network and convey information back to a user of the device. Examples of such client devices include personal computers, tablet computers, smart phones, notebook computers, and the like. A user can specify a search query, navigation request, or other such criterion that can be transmitted across at least one network 306, such as the Internet and/or a cellular network, among other such options. The request can be received to a shared resource environment 308, resource provider environment, or content provider environment, for example, which can include resources for processing the request. The resource provider can be associated with the content being searched or might offer or host search services for third party content, among other such options. The resource environment 308 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In this example, the request can be received to an interface layer 310 configured to direct incoming requests. As discussed in more detail elsewhere herein, the interface layer can include application programming interfaces (APIs) or other exposed interfaces enabling requests to be received by the provider environment. The interface layer 310 can include other components as well, such as at least one Web server, routing components, load balancers, and the like. When a request to obtain content is received, for example, the request (or information from the request) can be forwarded by the interface layer 310 to a content server 312 or other such sub-system or service for processing the request. The content server 312 can analyze the request, and attempt to dynamically determine the appropriate content to serve back to the device in response to the request.

In this example, the content can include images and other data or elements for instances of content stored to a content repository. A content classifier 320 can analyze at some of the images or other information as discussed herein to extract relevant features that can be used to select from among the elements. Information about the extracted features can be written to a feature repository 326 or other such location. When determining an image to display for an instance of content, the content server 312 can work with the content classifier 320 to determine the appropriate image based on the extracted features.

The content server 312 in this example can work with a cluster manager 324 to determine the features that are of interest, or a priority, for users of a determined cluster. As mentioned, an interaction manager 316 or other such service can store data for actions or behavior of users with respect to various presentations of content, and that data can be stored to an action repository 328 or other such location, associated with the relevant user data as stored to a user data repository 318. A cluster manager 324 can periodically analyze the data in the action and user repositories to perform clustering as discussed herein. The cluster data can be stored to a cluster repository 322 or other such location. When the content server 312 is to provide content, the content server can provide information such as the category and user identifier to the cluster manager 324, which can identify the relevant cluster and features that are relevant or important for that cluster. Those features can be used to determine the appropriate image(s) or other elements to provide with the content using the features extracted from those elements and stored to the feature repository 326. As mentioned, in some embodiments an image may not have been provided that includes or exhibits certain features, but can be modified to include or exhibit those features. Accordingly, a component or service such as a content manipulation service 330 can obtain the content from the content repository 314, for example, and manipulate the content to create new content, such as an image that includes a background with of a specific color or an image that has a specific filter applied. As discussed elsewhere herein, in many instances the image manipulation will be done offline and the images stored for use in serving subsequent requests.

Figure 4:
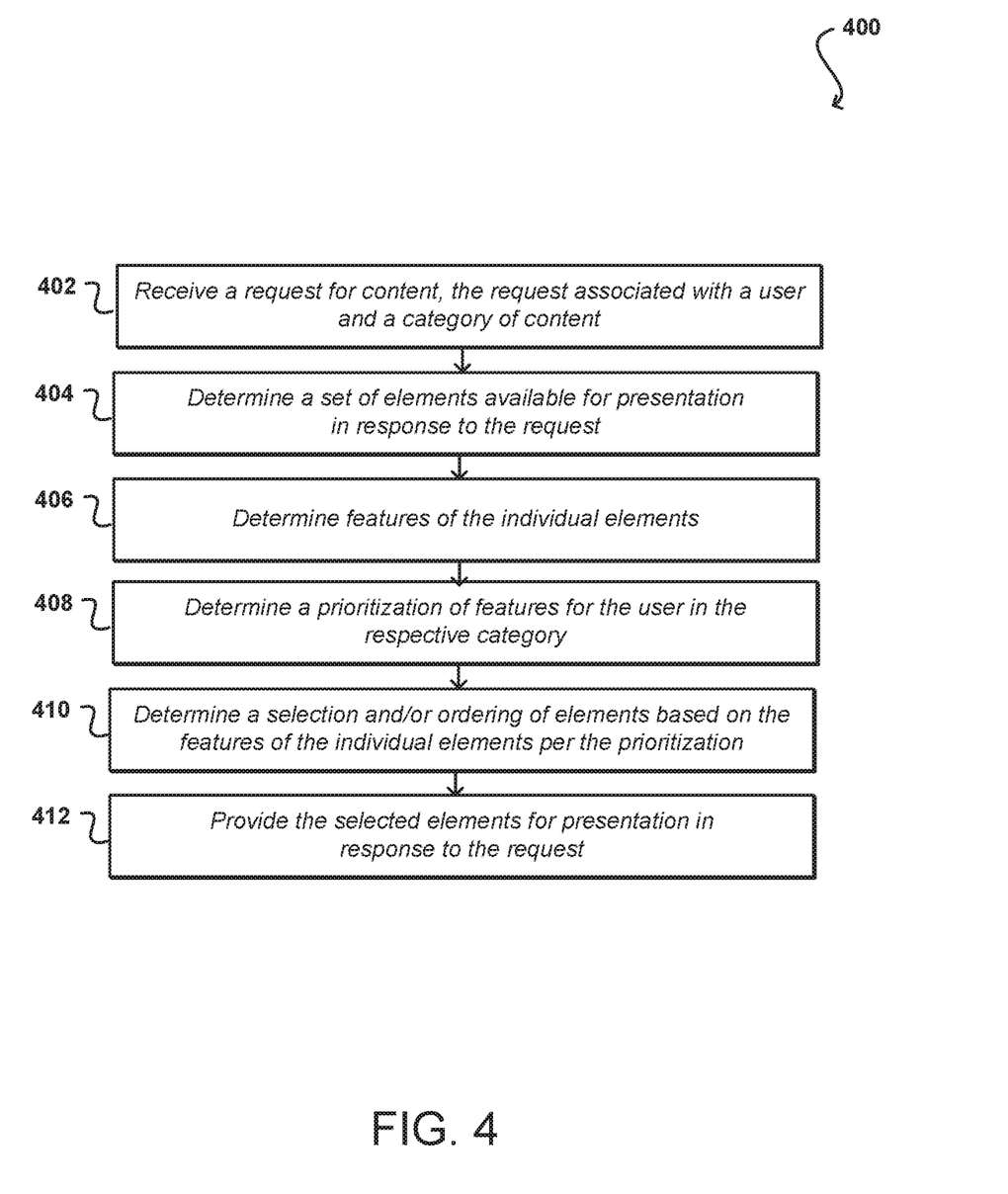
FIG. 4 illustrates an example process for determining elements to provide in response to a request for content that can be utilized in accordance with various embodiments.

FIG. 4 illustrates an example process 400 for determining elements to provide in response to a request for content that can be utilized in accordance with one embodiment. It should be understood for this and other processes discussed herein that there can be additional, alternative, or fewer steps performed in similar or alternative orders, or in parallel, within the scope of the various embodiments unless otherwise stated. Further, although images and media content associated with physical items are primary examples utilized herein, it should be understood that other types of objects or content can benefit from advantages of the various embodiments as well within the scope of the various embodiments. In this example, a request is received 402 for content, such as a search or navigation request received from a client device associated with a user. The request can be associated with a category or type of content to be obtained. A set of elements can be determined 404 that is available to be provided for presentation in response to the request. The elements can be associated with the instance(s) of content to serve the request, and can be of a number of different types. Types of elements can include, for example, images, video, text, widgets, content windows, audio, animation, virtual or augmented reality content, game content, and the like. The instances of content can include information, data, or other elements associated with an item, object, topic, occurrence, etc. An instance of content in some embodiments can correspond to any result that might be returned in response to a search query, where an instance of content might include information about an item offered for consumption through an electronic store or a topic available for access through an electronic library, among other such options. An example store might comprise a collection of network-accessible services executed on computer hardware that provide multiple channels (e.g., mobile app., voice-based search, web access, physical presence, etc.) through which customers (using client computing device) can access various catalogs stored in databases to find various products and services available to purchase, lease, etc. sometimes in the form of detail pages.

The features of at least some of the individual elements can be determined 406. As discussed herein, the features can be determined from metadata included with the elements or can include features extracted from the elements using one or more feature extraction algorithms, among other such options. Features for an image might relate to, for example, objects represented in the image, a type of background (e.g., indoor, outdoor, solid), color or brightness information for the image, and the like. Features relate to textual content as well, as may be identified through semantic analysis or another such approach. A prioritization of features can be determined 408 for the user and the respective category. As discussed, behavior or preference data can be analyzed to determine which features are most of interest to the user, or are most likely to result in a particular behavior. If the user has a relationship with one or more other users, as may be associated with a specific account, the behavior or preference data for those users can be considered as well, perhaps with a lower weighting with respect to data specific to that user. For example, where an image might be displayed to an entire family and only one family member makes the purchase, it might still be worthwhile to consider that other members of the family may have agreed with the purchase, been involved in the purchase, or might have separately made the purchase. Similarities of the users to the relationship may also be considered when determining the weighting or extent to which those actions should be attributed to both users. The prioritization can include a ranking or selection of features, or a weighting of various features, etc. Using the prioritization information and the features of the available elements, a selection and/or ordering of elements can be determined 410. This can include, for example, selecting a representative image to return with a search result, where the image with the highest feature score or prioritization for the user is selected. This can also include selecting a representative widget, or version of a widget, to display on an interface presenting the content, or determining a type of element to return, such as whether to return an image, video, or animation, etc. As mentioned, the prioritization may vary by category, time of data, user location, or other such factors. The selected elements can then be provided 412 for presentation in response to the request.

Figure 5:
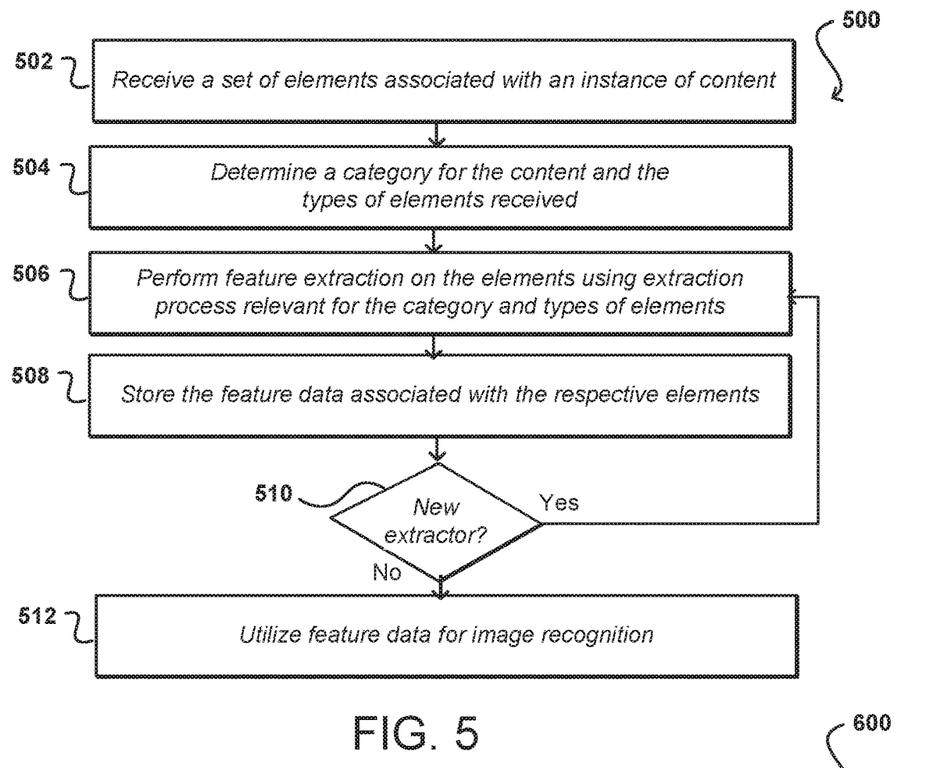
FIG. 5 illustrates an example process for performing feature extraction that can be utilized in accordance with various embodiments.

FIG. 5 illustrates an example process 500 for extracting features from the various elements that can be utilized in accordance with various embodiments. In this example, a set of elements is received 502, where those elements are associated with an instance of content. This can include, for example, images with different views of an item or video showing someone using the item, among other such options. A category for the instance of content can be determined 504, along with the types of elements received. As mentioned, this can be used to determine the types of features that may be relevant, as well as the feature extraction algorithm(s) to use for the various elements. Feature extraction can be performed 506 on the elements using the determined extraction process(es) relevant for the category and types of elements. As mentioned, this can include image feature extraction, textual feature extraction, audio feature extraction, and the like. The feature data can then be stored 508 and associated with the respective elements. As mentioned elsewhere herein, there may also be additional features that are utilized over time, such as where a new feature is determined to be relevant for a specific category of content. A new extractor might then be used to attempt to identify images or other content that exhibit that feature. Other new extractors might be used for other reasons as well, such as extractors that are more accurate or utilize a different extraction approach, etc. If it is determined 510 that there is a new or updated extractor to be utilized for a category of images or content, then the process can continue using the extractor to obtain updated feature data, which can be utilized 512 for image recognition or other purposes discussed or suggested elsewhere herein. Such an approach can be used to ensure that the most accurate and relevant features are determined for a set of content at any specific time. Thus, in many embodiments an instance of content will not be analyzed once to extract features with those features being the set of features that will always be associated with that instance.

Figure 6:
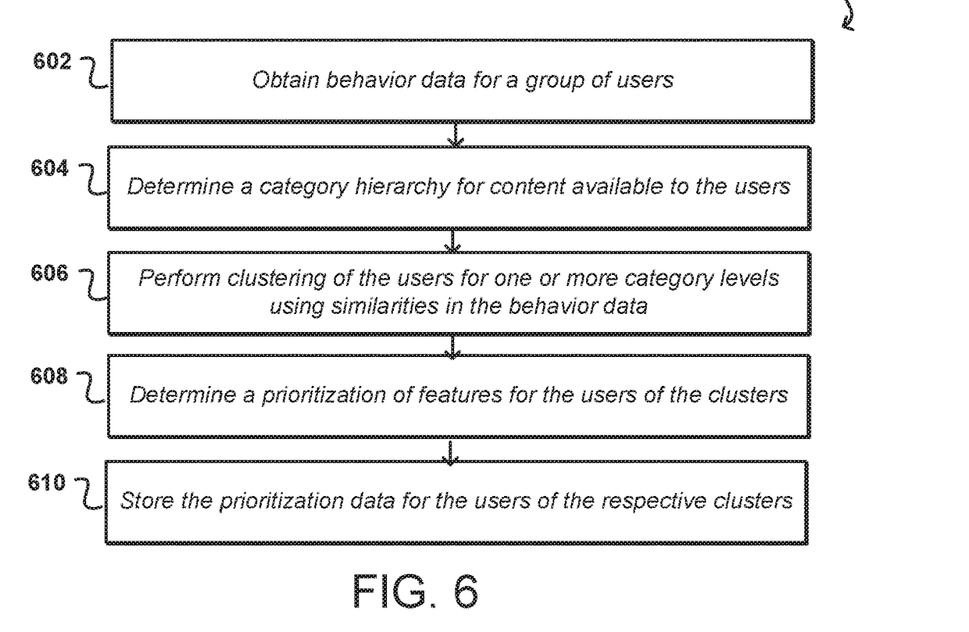
FIG. 6 illustrates an example process for performing user clustering that can be utilized in accordance with various embodiments.

FIG. 6 illustrates an example process 600 for clustering users using data, such as behavioral, historic, or preference data that can be utilized in accordance with various embodiments. In this example, the behavior (or other) data can be obtained 602 for a group of users. As discussed, in some embodiments the actions of various users can be detected and stored over time, including information about the content or elements that were presented to the users that triggered, or were otherwise associated with, those actions. Further, if a user has a relationship with one or more other users, such as a family member sharing an account, then actions of the related users can be considered as well. A category hierarchy can be determined 604 for content that is available to the users. Clustering of the users can be performed 606 for one or more levels of the hierarchy. Different clustering algorithms can be used for different categories or levels, and the clustering can attempt to group users based on similarities in the behavioral (or other) data obtained. A prioritization of features can be determined 608 for users of the individual clusters. The prioritization data can be determined by determining which features resulted in specific behaviors for users in the cluster when accessing content in a specific category. The prioritization data can then be stored 610 for the users of the individual clusters, which can be used for selecting elements for presentation as discussed elsewhere herein. As mentioned, periodic re-clustering can be performed to ensure accurate clustering based on current data, and users may be associated with different clusters based upon factors such as location, time of day, etc.

As one skilled in the art will appreciate in light of this disclosure, and as discussed elsewhere herein, certain embodiments may be capable of achieving certain technical advantages, including some or all of the following: reducing network load, reducing memory and processing requirements, reducing service use time, and simplifying user interfaces used to access content. These advantages can be obtained on client devices, network servers, data storage devices, and other such systems or components.

Figure 7:
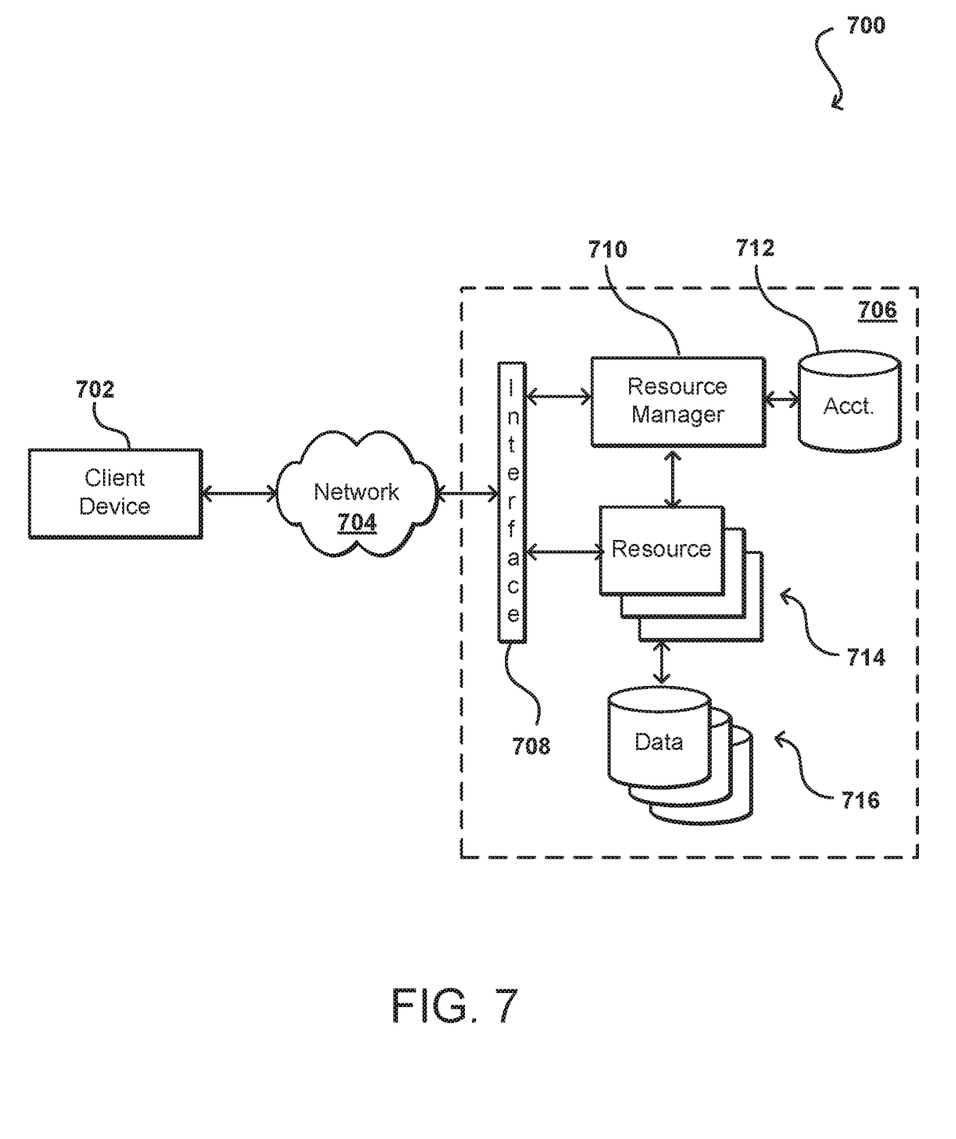
FIG. 7 illustrates an example environment in which various embodiments can be implemented.

FIG. 7 illustrates an example environment 700 in which aspects of the various embodiments can be implemented. In this example a user is able to utilize a client device 702 to submit requests across at least one network 704 to a multi-tenant resource provider environment 706. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 704 can include any appropriate network, including an intranet, the Internet, a cellular network, a local area network (LAN), or any other such network or combination, and communication over the network can be enabled via wired and/or wireless connections. The resource provider environment 706 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 714 of one or more types. These types can include, for example, application servers operable to process instructions provided by a user or database servers operable to process data stored in one or more data stores 716 in response to a user request. As known for such purposes, the user can also reserve at least a portion of the data storage in a given data store. Various methods for enabling a user to reserve various resources and resource instances can be used, such that detailed description of the entire process, and explanation of all possible components, will not be discussed in detail herein.

In at least some embodiments, a user wanting to utilize a portion of the resources 714 can submit a request that is received to an interface layer 708 of the provider environment 706. The interface layer can include application programming interfaces (APIs) or other exposed interfaces enabling a user to submit requests to the provider environment. The interface layer 708 in this example can also include other components as well, such as at least one Web server, routing components, load balancers, and the like. When a request to provision a resource is received to the interface layer 708, information for the request can be directed to a resource manager 710 or other such system, service, or component configured to manage user accounts and information, resource provisioning and usage, and other such aspects. A resource manager 710 receiving the request can perform tasks such as to authenticate an identity of the user submitting the request, as well as to determine whether that user has an existing account with the resource provider, where the account data may be stored in at least one data store 712 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 702 to communicate with an allocated resource without having to communicate with the resource manager 710, at least until such time as a relevant aspect of the user account changes, the user is no longer granted access to the resource, or another such aspect changes.

The resource manager 710 (or another such system or service) in this example can also function as a virtual layer of hardware and software components that handles control functions in addition to management actions, as may include provisioning, scaling, replication, etc. The resource manager can utilize dedicated APIs in the interface layer 708, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 708 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally. API servers, as well as the persistent data store, can be spread across multiple data centers in a region, for example, such that the servers are resilient to single data center failures.

Figure 8:
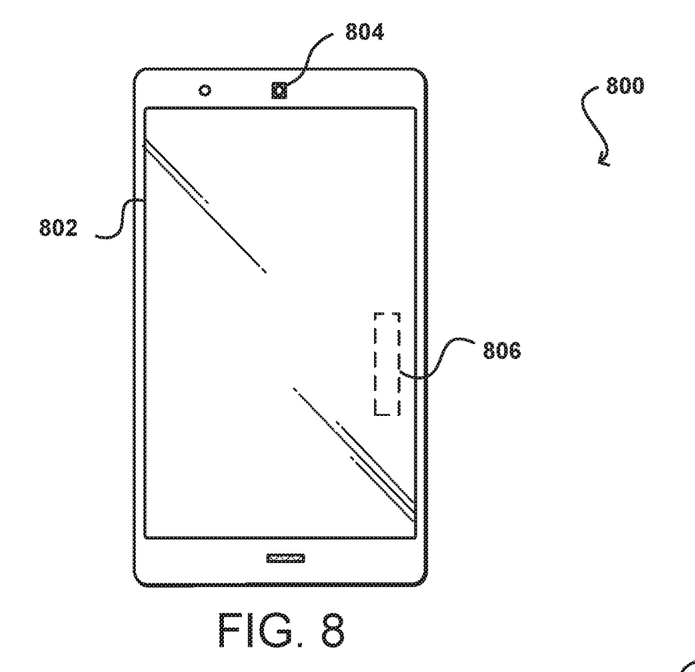
FIG. 8 illustrates an example computing device that can be utilized to capture and provide image data in accordance with various embodiments.

FIG. 8 illustrates an example computing device 800 that can be used to perform methods in accordance with various embodiments discussed and suggested herein. In this example, the device has at least one camera or sensor 804 positioned at one or more locations for capturing image data. The device also includes a display element 802 that can be used to provide a live view of image data captured by the camera, in order to assist with image capture. In this example, the camera and/or sensor are each capable of capturing image information over at least a visible spectrum, and in at least some embodiments can select between operational modes. It should be understood, however, that there can be fewer or additional elements of similar or alternative types in other embodiments, and that there can be combinations of cameras, infrared detectors, gesture sensors, and other such elements used with various devices. A communications element 806 can be included that enables the device to, wired or wirelessly, communicate information such as captured image data across at least one network Various other elements and combinations of elements can be used as well within the scope of the various embodiments as should be apparent in light of the teachings and suggestions contained herein.

Figure 9:
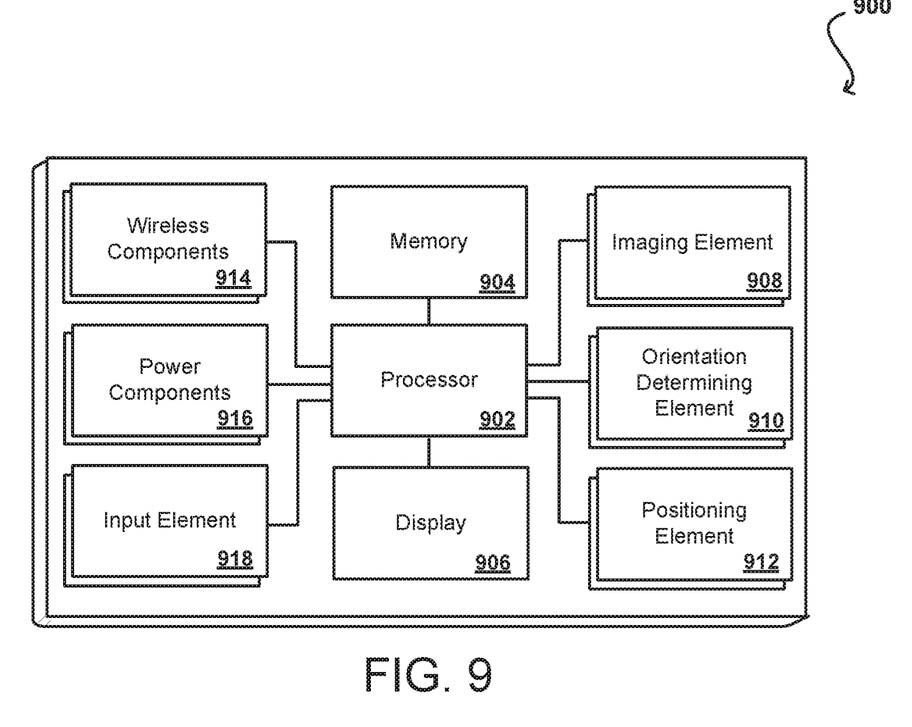
FIG. 9 illustrates example components of a computing device that can be used to implement aspects of the various embodiments.

FIG. 9 illustrates a set of basic components of an electronic computing device 900 that can be utilized to implement aspects of the various embodiments. In this example, the device includes at least one processing unit 902 for executing instructions that can be stored in a memory device or element 904. As would be apparent to one of ordinary skill in the art, the device can include many types of memory, data storage, or computer-readable media, such as a first data storage for program instructions for execution by the processing unit(s) 902, the same or separate storage can be used for images or data, a removable memory can be available for sharing information with other devices, and any number of communication approaches can be available for sharing with other devices. The device typically will include some type of display screen 906, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 908, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Various methods for capturing images using a camera element with a computing device can be used. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 900 also includes at least one orientation determining element 910 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 900. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 912 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 914 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections.

The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 918 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Various methods for using elements such as accelerometers to determine movement of a device can be used. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C #or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving, from a client device associated with a user, a request for content in a category;
determining a set of images providing one or more views of an instance of the content to be provided in response to the request;
determining respective image features exhibited by individual images in the set;
determining a prioritization of the respective image features exhibited by individual images in the set, the prioritization associated with historical behavior data of the user;
determining, from the set, a selected image from the set based at least in part upon the respective image features exhibited by the selected image according to the prioritization; and
providing, with the instance of the content, the selected image for presentation on the client device.

2. The computer-implemented method of claim 1, further comprising:
analyzing the set of images using at least one feature extraction algorithm to determine the respective image features exhibited by the individual images in the set.

3. The computer-implemented method of claim 2, wherein the respective image features for an individual image include at least one of a type of view of an object represented in the individual image, a type of background, a presence of a human representation, a presence of an additional object representation, color information, or scale information for an object in the individual image.

4. The computer-implemented method of claim 1, further comprising:
analyzing past behavior data for a plurality of persons including the user;
clustering the plurality of persons into a set of clusters using the past behavior data; and
determining, based in part upon image features of images associated with the past behavior data, the prioritization of image features for the category.

5. The computer-implemented method of claim 4, wherein the past behavior data includes data for actions taken by the user that are associated with presentations of images having specific image features.

6. A computer-implemented method, comprising:
receiving, on behalf of a user, a request for content;
determining, based on historical behavior data of the user, at least one feature preference of the user;
determining a set of elements, associated with the content, which are able to be provided for presentation in response to the request, at least a subset of the elements exhibiting different element features;
determining, using the at least one feature preference of the user and the different element features exhibited by the at least a subset of the elements, a selected element from the at least a subset of the elements, the selected element being identified from the set of elements or generated based on a determined element of the set of elements; and
providing the selected element with the content in response to the request.

7. The computer-implemented method of claim 6, wherein the set of elements include at least one of an image, video, animation, game content, block of text, interface module, audio, virtual reality content, or augmented reality content.

8. The computer-implemented method of claim 6, further comprising:
receiving the set of elements associated with the content; and
analyzing the set of elements using at least one feature extraction algorithm to determine the respective features exhibited by individual elements in the set.

9. The computer-implemented method of claim 8, wherein the element features include at least one of a type of view of an object represented, a type of background, a presence of a human representation, a presence of an additional object representation, color information, audio feature information, textual feature information, or scale information.

10. The computer-implemented method of claim 6, further comprising:
analyzing past behavior data for a plurality of persons including the user;
clustering the plurality of persons into a set of clusters using the past behavior data; and
determining, based in part upon features of images associated with the past behavior data, the at least one feature preference of the user.

11. The computer-implemented method of claim 10, further comprising:
determining a respective cluster, of the set of clusters, for the user with respect to the request; and
determining the at least one feature preference from feature preference data of the respective cluster.

12. The computer-implemented method of claim 10, wherein the past behavior data includes data for actions taken by the user that are associated with presentations of images having specific features.

13. The computer-implemented method of claim 10, further comprising:
performing periodic re-clustering for the plurality of persons using additional behavior data obtained for the plurality of persons.

14. The computer-implemented method of claim 6, further comprising:
determining a category for the content; and
determining the at least one feature preference of the user for the determined category.

15. The computer-implemented method of claim 6, further comprising:
determining one or more element features from metadata included with the set of elements.

16. The computer-implemented method of claim 6, further comprising:
determining a relationship of a user to a second user; and
determining the at least one feature preference based on one or more feature preferences of the second user.

17. A system, comprising:
at least one processor; and
memory including instructions that, when executed by the at least one processor, cause the system to:
receive, on behalf of a user, a request for content;
determine, based on historical behavior data of the user, at least one feature preference of the user;
determine a set of elements, associated with the content, which are available to be provided for presentation in response to the request, at least a subset of the elements exhibiting different element features;
determine, using the at least one feature preference of the user and the different element features exhibited by the at least a subset of the elements, a selected element from the at least a subset of the elements, the selected element being identified from the set of elements or generated based on a determined element of the set of elements; and
provide the selected element with the content in response to the request.

18. The system of claim 17, wherein the instructions when executed further cause the system to:
receive the set of elements associated with the content; and
analyze the set of elements using at least one feature extraction algorithm to determine the respective features exhibited by individual elements in the set.

19. The system of claim 17, wherein the instructions when executed further cause the system to:
analyze past behavior data for a plurality of persons including the user;
cluster the plurality of persons into a set of clusters using the past behavior data; and
determine, based in part upon features of images associated with the past behavior data, the at least one feature preference of the category.

20. The system of claim 19, wherein the instructions when executed further cause the system to:
determine a respective cluster, of the set of clusters, for the user with respect to the request; and
determine the at least one feature preference from feature preference data of the respective cluster.

* * * * *